United States Patent
Parker et al.

(10) Patent No.: US 12,492,965 B2
(45) Date of Patent: Dec. 9, 2025

(54) SYSTEMS AND METHODS FOR METHANE NUMBER CALCULATION

(71) Applicant: Caterpillar Inc., Peoria, IL (US)

(72) Inventors: Matthew Parker, Washington, IL (US); Geetika Dilawari, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 272 days.

(21) Appl. No.: 18/186,300

(22) Filed: Mar. 20, 2023

(65) Prior Publication Data
US 2024/0319044 A1    Sep. 26, 2024

(51) Int. Cl.
*G01M 15/05* (2006.01)
*F02M 21/02* (2006.01)
*F02M 21/04* (2006.01)

(52) U.S. Cl.
CPC ........ *G01M 15/05* (2013.01); *F02M 21/0209* (2013.01); *F02M 21/04* (2013.01)

(58) Field of Classification Search
CPC .... G01M 15/05; F02M 21/0209; F02M 21/04
See application file for complete search history.

(56) References Cited

U.S. PATENT DOCUMENTS

| | | | |
|---|---|---|---|
| 10,823,096 B2 | 11/2020 | Turlapati et al. | |
| 2015/0090222 A1* | 4/2015 | Rebinsky | F02D 41/0027 123/435 |
| 2016/0208764 A1* | 7/2016 | Mann | F02P 5/152 |
| 2017/0101948 A1 | 4/2017 | Kunkel | |
| 2018/0372013 A1* | 12/2018 | Turlapati | F02D 35/027 |
| 2023/0167762 A1* | 6/2023 | Spyra | F02D 19/10 123/258 |

FOREIGN PATENT DOCUMENTS

| | | |
|---|---|---|
| JP | 2021-42734 A | 3/2021 |
| WO | 2021127713 A1 | 7/2021 |
| WO | 2022023004 A1 | 2/2022 |

* cited by examiner

*Primary Examiner* — Eric S. McCall
(74) *Attorney, Agent, or Firm* — Bookoff McAndrews, PLLC

(57) ABSTRACT

A system for estimating methane number of fuel includes a sensor configured to generate a signal indicative of a heat release of fuel combusted with an internal combustion engine and a controller. The controller is configured to receive the signal from the sensor, determine a methane number of fuel supplied to the internal combustion engine based on the signal from the sensor, and output a notification based on the methane number.

7 Claims, 3 Drawing Sheets

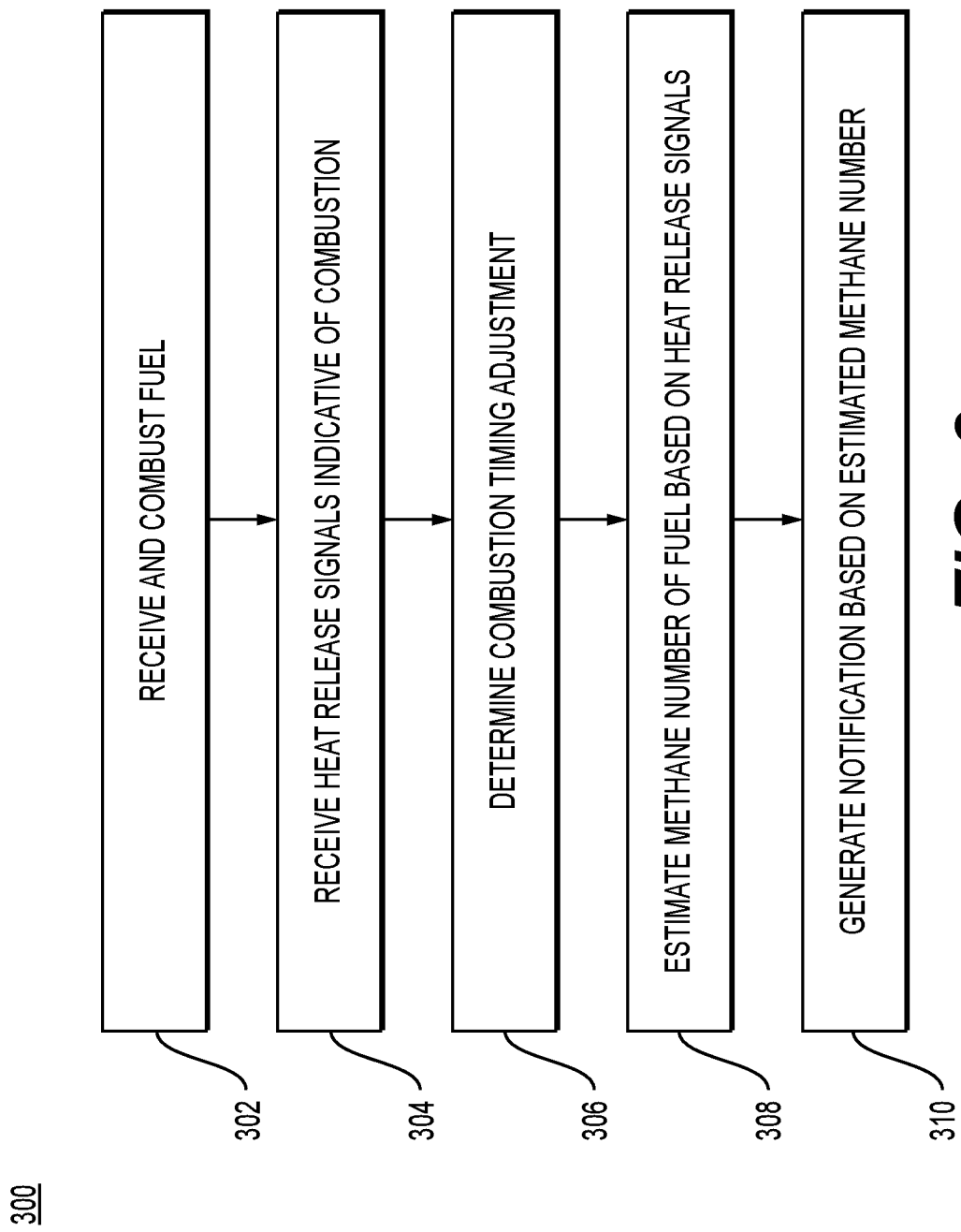

SYSTEMS AND METHODS FOR METHANE NUMBER CALCULATION

TECHNICAL FIELD

This disclosure relates generally to systems and methods for internal combustion engines, and more particularly, to systems and methods for estimating methane number of fuel used with an internal combustion engine.

BACKGROUND

Internal combustion engines are useful in a variety of different situations and in differing types of machines. For example, internal combustion engines are used to generate power for mobile machines, vehicles, and mobile or stationary power generation systems, to name a few. While some engines use only liquid fuel (e.g., either gasoline or diesel fuel), some engines are capable of operating with a gaseous fuel, either alone or in combination with a liquid fuel. Some engines, sometimes referred to as "dual fuel" engines, can operate by injecting two different types of fuel in a single combustion cycle, such as diesel fuel injected to generate a pilot flame and a gaseous fuel injected as a primary fuel. Gaseous fuel engines, including some spark-plug equipped dual fuel engines, are able to combust one or more types of gaseous fuels, including natural gas, methane, and others. Different types of gaseous fuels have different combustion characteristics, depending on the constituents that make up the fuel. The constituents of the fuel may change as a result of the source of the fuel, the time in which the fuel was processed, or even manual blending of different types of gaseous fuel (e.g., natural gas blended with $H_2$ gas). One method of quantifying the performance characteristics of a gaseous fuel is to calculate a "methane number." which is a measure of how resistant the fuel is to detonation. While engine systems can be designed to tolerate changes in methane number, for example, these changes can significantly impact engine performance Some methods and systems involve sampling fuel to determine methane number, and adjusting the fuel blend or inputting the sample's methane number into an engine controller, allowing the controller to take the combustion qualities of the fuel into consideration based on the methane number. While these methods might be helpful, they can be cumbersome, and require advance knowledge of the methane number of fuel. Additionally, even when methane number of a particular fuel is known, changes due to active fuel blending might introduce changes that are not accounted for.

An exemplary control device for an internal combustion engine is described in JP Publication No. 2021-042734 A ("the '734 publication") to Tokunaga et al. The device described in the '734 publication involves detection of methane number based on detected excess air (via a lambda sensor) or based on air-fuel ratio determined by the engine system. While the device described in the '734 publication may be useful for methane number calculations based on detected excess air (i.e., non-combusted oxygen), it may be unable to detect methane number in situations where excess air is not present, or may calculate methane number inaccurately, or calculate methane number in an engine system that compensates for changes in engine performance in a manner that independently impacts the quantity of excess air detected in exhaust.

The techniques of this disclosure may solve one or more of the problems set forth above and/or other problems in the art. The scope of the current disclosure, however, is defined by the attached claims, and not by the ability to solve any specific problem.

SUMMARY

In one aspect, a system for estimating methane number of fuel may include a sensor configured to generate a signal indicative of a heat release of fuel combusted with an internal combustion engine and a controller. The controller may be configured to receive the signal from the sensor, determine a methane number of fuel supplied to the internal combustion engine based on the signal from the sensor, and output a notification based on the methane number.

In another aspect, a system for monitoring methane number of fuel may include an internal combustion engine having a plurality of engine cylinders, a pressure sensor configured to generate a pressure signal indicative of pressure within one or more of the engine cylinders, and a controller configured to calculate methane number of fuel supplied to the internal combustion engine based on the pressure signal.

In yet another aspect, a method for estimating methane number of fuel may include receiving and combusting fuel with an internal combustion engine, and receiving a signal indicative of heat release of fuel combusted with an internal combustion engine. The method may further include determining a combustion timing of the fuel based on the signal, and estimating the methane number of fuel based on the combustion timing.

BRIEF DESCRIPTION OF THE DRAWINGS

The accompanying drawings, which are incorporated in and constitute a part of this specification, illustrate various exemplary embodiments and together with the description, serve to explain the principles of the disclosure.

FIG. 3 is a flowchart showing an exemplary method for estimating methane number.

DETAILED DESCRIPTION

Both the foregoing general description and the following detailed description are exemplary and explanatory only and are not restrictive of the features, as claimed. As used herein, the terms "comprises," "comprising," "having," including," or other variations thereof, are intended to cover a non-exclusive inclusion such that a method or apparatus that comprises a list of elements does not include only those elements, but may include other elements not expressly listed or inherent to such a method or apparatus. In this disclosure, relative terms, such as, for example, "about," "substantially," "generally," and "approximately" are used to indicate a possible variation of ±10% in the stated value or characteristic. As used herein, the phrase "based on" is understood to be equivalent to the phrase "based at least on," unless indicated otherwise.

Figure 1:
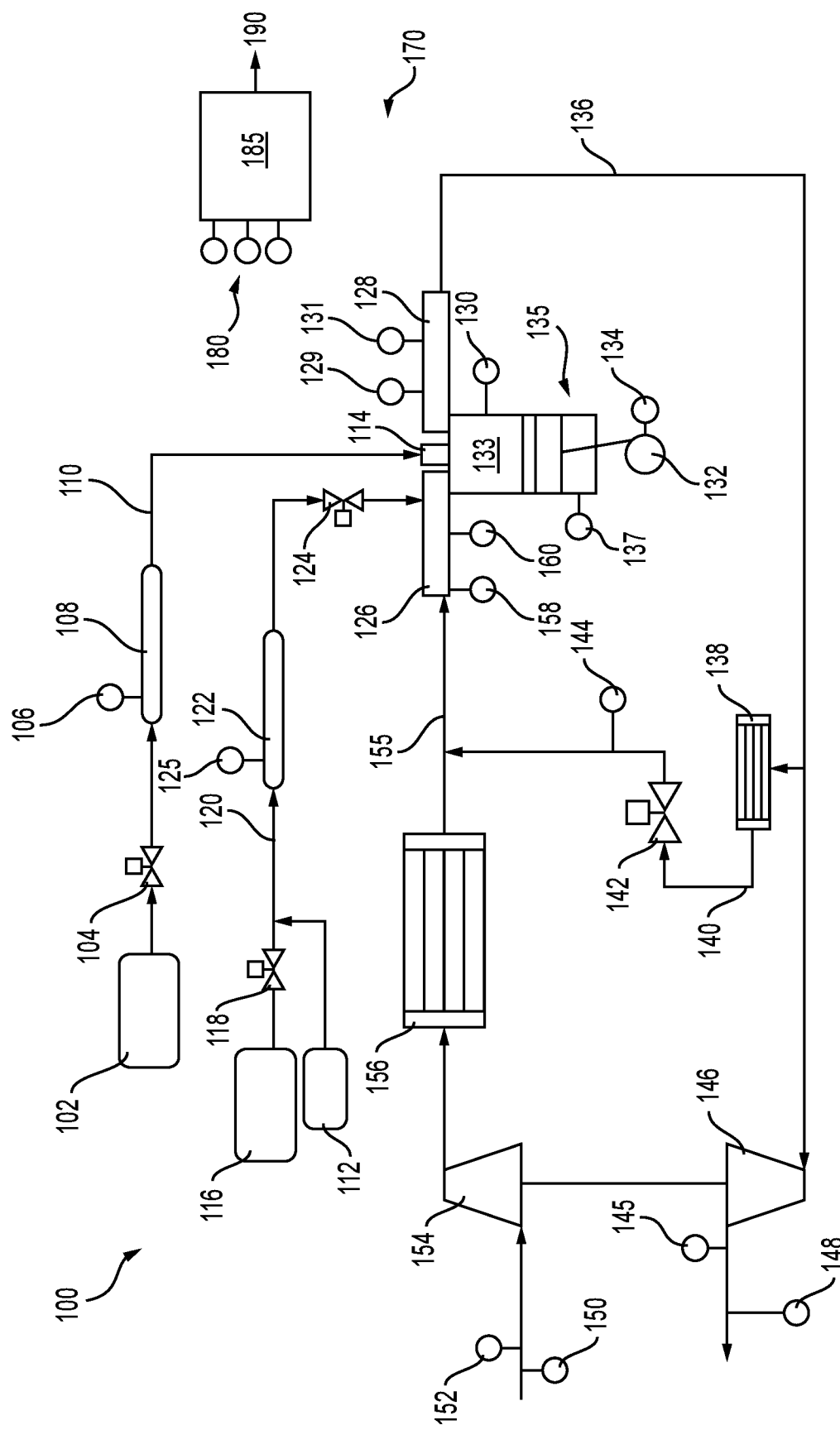
FIG. 1 is a diagram illustrating a system for estimating methane number of fuel, according to aspects of the disclosure.

FIG. 1 is a diagram illustrating a methane number estimation system 100, according to aspects of the present disclosure. System 100 may include an internal combustion engine 135 (represented as one cylinder in FIG. 1), a pilot fuel source 102 (if desired) and a primary fuel source 116, a sensor system 170, and a controller 185 (e.g., an electronic control module) in communication with sensor system 170.

In the configuration shown in FIG. 1, system 100 may be configured to supply gaseous fuel to engine 135 from a gaseous fuel source 116. In dual-fuel configurations, system 100 may also be configured to supply a liquid fuel from a pilot fuel source 102. As used herein, a "gaseous fuel" includes fuels that are supplied to a fuel injector (e.g., an admission valve 124) in a gaseous form. Thus, the term "gaseous fuel" includes fuels stored in gaseous form, liquid form, or a mixture of gaseous and liquid forms, while present in a fuel tank or other storage device. Exemplary gaseous fuels include, but are not limited to, natural gas, methane, propane, hydrogen, and blends thereof. As used herein, a "liquid fuel" includes fuels that are supplied to a fuel injector (e.g., an injector 114) in a liquid form. Exemplary liquid fuels include, but are not limited to, diesel fuel, ethanol, methanol, gasoline.

Pilot fuel source 102 may include a storage device or tank containing diesel fuel or another type of liquid fuel useful as a pilot fuel. Pilot fuel source 102 may be connected to a common fuel rail 108 via a fuel control valve 104 (e.g., a shutoff valve). A pilot fuel supply passage 110 may extend to supply fuel to fuel injector 114. Injector 114 may be a direct injector, as shown in FIG. 1, or a port injector.

Primary fuel source 116 may include one or more tanks or other types of storage devices containing a fuel with an unknown and/or changing methane number (sometimes abbreviated as "MN" herein). Primary fuel source 116 may be connected to a gas fuel rail 122 via a gas supply passage 120, a gaseous fuel control valve 118 being connected to passage 120. Fuel control valve 118 may include a shutoff valve and/or pressure regulating valve to control flow of fuel (e.g., natural gas) from primary fuel source 116. An admission valve 124 may be connected downstream of gas fuel rail 122 to supply fuel to an intake manifold 126 of engine 135.

In some aspects, system 100 may include a hydrogen-blending device 112 (e.g., hydrogen gas fuel source, pumps, valves, etc.) that introduce hydrogen gas to another type of gaseous fuel, such as natural gas. For example, system 100 may be configured to actively blend hydrogen upstream (not shown) or downstream of fuel source 116, such that the amount of hydrogen gas supplied to engine 135 changes over time. Additionally, the blend of fuel in fuel source 116 may change over time following fuel deliveries, changes in fuel type or fuel source, etc. These changes may impact MN of fuel supplied to engine 135, as described below.

Engine 135 may include a plurality of cylinders 133 that define a respective number of combustion chambers. While only cylinder 133 is shown in FIG. 1, engine 135 may contain any number of cylinders, including two, four, five, six, eight, ten, twelve, twenty, or more. Pistons of each cylinder may be connected to a crankshaft 132 for transferring power to a generator, a transmission, or other device.

An air intake path for engine 135 may include a compressor 154, an air cooler 156, an air supply passage 155, and intake manifold 126. An exhaust path may include an exhaust manifold 128, an exhaust passage 136, and a turbine 146. One or more exhaust aftertreatment devices (not shown) may also be included in the exhaust path. An exhaust gas recirculation ("EGR") path may connect exhaust passage 136 and air supply passage 155. The EGR path may include an exhaust cooler 138, an EGR passage 140, and an EGR valve 142 that regulates a quantity of exhaust gas that recirculates to the air intake path.

Sensor system 170 may include sensors that generate electrical signals based on various parameters of the fuel, air, exhaust, and mechanical aspects of system 100. Sensor system 170 may include, for example, a pilot fuel pressure sensor 106, a primary fuel pressure sensor 125, an exhaust manifold pressure sensor 129, an in-cylinder pressure sensor 130, an exhaust manifold temperature sensor 131, an intake manifold pressure sensor 158, an intake manifold temperature sensor 160, an engine speed sensor 134, an engine coolant sensor 137, an EGR sensor 144, an exhaust pressure and/or temperature sensor 145, an exhaust constituent sensor 148 (e.g., one or more sensors for calculating $NO_x$ and/or $O_2$ content of exhaust), an airflow sensor 150, and a humidity sensor 152. Each sensor of sensor system 170 may be configured to generate signals that are received by controller 185 as inputs 180.

Controller 185 may be a control module that controls one or more aspects of system 100, including the behavior of internal combustion engine 135. Controller 185 may be a single controller configured to control engine 135 and calculate methane number of fuel (e.g., methane number of the primary fuel). If desired, controller 185 may be a single controller dedicated to methane number analysis. As used herein the term "controller," while singular, includes both a single controller and multiple controllers that operate with engine 135. Thus, controller 185 may be implemented as a plurality of distributed control modules in communication with each other.

Controller 185 may be enabled, via programming, to receive inputs 180 (e.g., from sensor system 170) generate outputs 190 that indicate MN. Controller 185 may be configured to generate outputs that control engine 135 based on the calculated MN, if desired. These outputs 190 are described below with respect to FIG. 2.

Controller 185 may embody a single microprocessor or multiple microprocessors that receive inputs 180 and generate outputs 190. Controller 185 may include a memory, as well as a secondary storage device, a processor, such as a central processing unit, or any other means for accomplishing a task consistent with the present disclosure. The memory or secondary storage device associated with controller 185 may store data and software to allow controller 185 to perform its functions, including the functions described with respect to method 300, described below. In particular, the memory for controller 185 may store instructions that, when executed by one or more processors, enable these processors to perform each of the methane number calculation functions described herein. Numerous commercially available microprocessors can be configured to perform the functions of controller 185. Various other known circuits may be associated with controller 185, including signal-conditioning circuitry, communication circuitry, and other appropriate circuitry.

Figure 2:
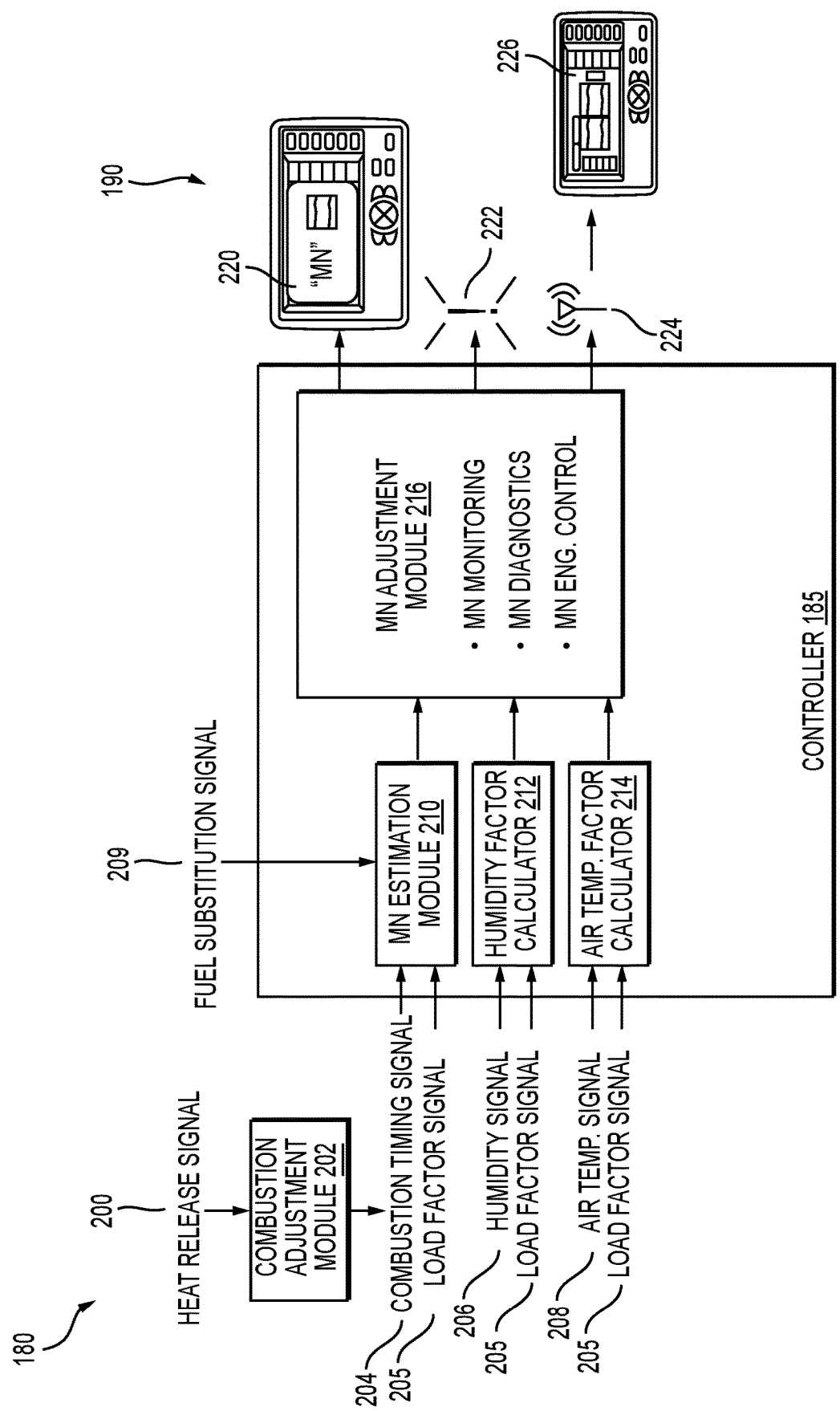
FIG. 2 is a block diagram representing a controller for estimating methane number.

FIG. 2 is a block diagram of components of system 100, including controller 185. As shown in FIG. 2, controller 185 may include an MN estimation module 210, humidity factor calculator 212, air temperature factor calculator 214, and an MN adjustment module 216. System 100 may include a combustion adjustment module 202, which, while shown outside of controller 185, may also be incorporated in controller 185. Inputs 180 may include calculated and/or sensed signals. Calculated signals may include combustion timing signal 204 (e.g., a signal representing injection timing or spark timing) and load factor signal 205. Calculated signals may be received by controller 185 or calculated by controller 185 itself.

Heat release signal 200 may include signals that correspond to one or more sensed values useful for calculating heat release of fuel supplied to engine 135. In particular, signals 200 may represent a crankshaft position (e.g., a crankshaft position measured as degrees of crankshaft rotation or camshaft rotation) at which primary fuel combusts within engine 135. Exemplary heat release signals 200 may include a pressure signal from in-cylinder pressure sensor 130. Heat release signals 200 may include, in addition to or instead of signals from pressure sensor 130, signals from: exhaust manifold pressure sensor 129, exhaust manifold temperature sensor 131, engine speed sensor 134, or others.

Combustion adjustment module 202 may be configured to generate engine timing adjustments based on signals 200. For example, combustion adjustment module 202 may determine a rate or heat release phasing, one or both of which may be included in a "heat release timing." A heat release rate may represent the speed at which heat increases. Heat release phasing may correspond to the amount of time at which a particular amount of heat (e.g., 50% of total heat) to be released. These timings may be measured by crankshaft position (e.g., degrees of rotation following top dead center). The heat release timing may be, for example a heat release rate or phasing at which primary fuel is combusted. Combustion adjustment module may determine a difference between the actual heat release rate or phasing, as measured by signal 200, and an expected heat release rate or heat release phasing.

Combustion adjustment module 202 may determine engine adjustments necessary for minimizing the difference between the actual and expected or desired heat release rate or phasing, and may output a combustion timing signal 204 based on the magnitude of these adjustments and/or the difference between the desired heat release rate or phasing and actual heat release rate or phasing to MN estimation module 210. For example, combustion timing signal 204 may correspond to an adjustment made to fuel injection timing, such as timing adjustments made to injector 114 and/or to admission valve 124. Combustion timing signal 204 may correspond to timing adjustments made to spark generation, such as a command sent to a spark plug when engine 135 is operating solely on gaseous fuel. In some aspects, a combustion timing signal 204 indicating that heat release was faster and/or more advanced than expected (and thus delayed combustion is desirable) may correspond to lower MN values. Conversely slower and/or later than expected heat release may indicate higher MN values.

Load factor signal 205 may include, or may be based on, estimated fuel delivery (e.g., a quantity of fuel delivered to cylinder 133 for one or more injection events). The estimated fuel delivery may be a calculated value, and may further take into account one or more sensed values (e.g., the above-referenced fueling signals, engine speed signals, etc.). In some aspects, load factor signal 205 may include, or may be based on, indicated mean effective pressure ("IMEP"). IMEP may be a value calculated based on signal 200 generated with in-cylinder pressure sensor 130. IMEP may represent the mean value of pressure within cylinder 135 over a period of time (e.g., over 720 degrees of crankshaft rotation).

Inputs 180 may include a load factor signal 205 that indicates a current load on engine 135. Load factor signal 205 represent mass airflow sensed with airflow sensor 152, fueling signals from pilot fuel pressure sensor 106 and/or primary fuel pressure sensor 125, engine speed signals from engine speed sensor 134, intake manifold pressure signals from sensor 158, or intake manifold temperature signals from intake manifold temperature sensor 160. These signals may collectively form load factor signal 205 and may enable controller 185 to determine a current load placed on engine 135.

Inputs 180 may also include a humidity signal 206, which is generated with humidity sensor 152 or an estimated value, an air temperature signal 208 generated with intake manifold temperature sensor 160, and a fuel substitution signal 109 that corresponds to a relative amount of the primary fuel to the secondary fuel. When humidity signal 206 is a calculated or estimated value (e.g., when no physical humidity sensor 152 is present), controller 185 may calculate or receive an estimated humidity based on measured or calculated values other than humidity (e.g., location, temperature signals, barometric pressure, etc.). Fuel substitution signal 209 may correspond to a calculated value that reflects the ratio of the pilot fuel to the total fuel amount (e.g., the sum of the primary and pilot fuels), or a percentage of the pilot fuel (e.g., diesel fuel) that is replaced with the primary fuel in comparison to an engine operating solely on the pilot fuel. Thus, fuel substitution signal 209 may represent the amount of pilot fuel that is effectively substituted with the primary gaseous fuel, relative to an operation under pilot fuel only.

While not shown in FIG. 2, controller 185 may receive additional signals as inputs 180 for adjusting MN calculations with MN adjustment module 216. These signals for adjusting an estimated MN may include, for example, engine speed from engine speed sensor 134, coolant temperature measured with engine coolant sensor 137, pressure of liquid fuel from pilot fuel pressure sensor 106, EGR rate measured with EGR sensor 144, calculated intake or exhaust valve timing, compression ratio, exhaust pressure and/or temperature measured with exhaust sensor 145, or $NO_x$ or $O_2$ content measured with exhaust sensor 148.

MN estimation module 210 may be configured to make an initial MN calculation based on the engine timing represented by signal 204 and load factor represented by signal 205. MN estimation module 210 may calculate MN values based on signals 200 from in-cylinder pressure sensor 130 and based on the current load factor represented by signal 205. This estimation may be performed by using of one or more look-up tables, maps, or equations that provide correlations between heat release timing, load factor, and methane number.

Humidity factor calculator 212 and air temperature factor calculator 214 may be configured to output a humidity adjustment and air temperature adjustment, respectively, to MN adjustment module 216. Signals from intake manifold temperature sensor 160 and humidity sensor 152 (or a calculated humidity value) may be used to calculate these respective adjustments using one or more look-up tables, maps, or equations. If desired, estimations performed by MN estimation module 210, humidity factor calculator 212, or air temperature factor calculator 214, may employ calculations other than look-up tables, maps, or equations, such as model predictive control.

MN adjustment module 216 may receive the initial MN estimation from module 210, as well as the humidity and air temperature adjustments from humidity factor calculator 212 and air temperature factor calculator 214, respectively. If desired, MN adjustment module 216 may also receive one or more of the above-described additional signals as inputs 180 for adjusting MN calculations. Module 216 may be configured to adjust the initial MN calculation from MN estimation module 210 based on adjustments output from humidity factor calculator 212 and from air temperature factor calculator 214, resulting in an adjusted MN. If desired, MN adjustment module 216 may filter the adjusted MN to remove noise introduced in the signal or otherwise improve monitoring and diagnostic accuracy.

In addition to calculating MN, and if desired, adjusting and/or filtering the calculated MN, MN adjustment module 216 may store historical MN values for MN monitoring, perform MN diagnostics, or control one or more aspects of engine 135 based on the adjusted MN (MN eng. control). MN monitoring functions may enable lookup and display of prior MN values, as well as analysis of aggregate MN values (e.g., mean MN). MN monitoring may enable the identification of trends, such as regular declines in MN. MN monitoring may further enable lookup of MN at a particular date or time (e.g., to review the impact of a refueling event on MN over a period of time).

MN diagnostic functions of MN adjustment module 216 may identify instantaneous or issues associated with MN, or determine when the current MN value is marginal or acceptable. MN monitoring functions of module 216 may also facilitate these MN diagnostics, such as identifying gradual changes in MN, in addition to instantaneous changes. For example, diagnostic functions may identify an issue when a current MN is below a predetermined threshold, as described below with respect to outputs 190. Diagnostic functions may also determine when low but acceptable MN is calculated following fueling with a particular fuel type, fuel from a particular source, or other situations. These diagnostics may be output via one or more of outputs 190.

MN engine control functions may include changing a timing at which a spark is generated for future operation of engine 135, changing a timing for injection of fuel via admission valve 124, or both. MN engine control functions may seek to minimize unexpectedly advanced or delayed combustion. When active hydrogen blending is performed, MN engine control may involve increasing or decreasing an amount of hydrogen supplied with hydrogen-blending device 112, thereby targeting a particular combustion timing and/or a particular MN. While not shown in FIG. 2, these MN control functions may be included in outputs 190.

Outputs 190 generated with controller 185 may include notifications, such as a machine MN display 220, a warning 222, and a fleet MN display 226. Machine MN display 220 may cause display of the calculated MN on a display associated with a particular machine. This display may be located on or in the same worksite as engine 135. The displayed MN may include instantaneous values or historical values, and may be numerical or in the form of text. When historical MNs are calculated and monitored, trends in the MN may be displayed or analyzed. For example, a series of different MNs that were measured at different times may be displayed, allowing an observer to identify the date or time when a change in MN occurred. For example, conditions associated with increasing or decreasing MN may identified by correlating known events with changes in MN at a particular time. Exemplary events may include refueling events, changes in fuel mixture, changes in fuel source (e.g., changes in the fuel supplier), and activation, deactivation, or changes in hydrogen blending via device 112. If desired, MN may be represented in a qualitative manner (e.g., green representing an acceptable MN, yellow representing a marginal MN, and red representing an unacceptable MN).

Warning 222 may be displayed on the display located on or in the same worksite as engine 135. Warning 222 may indicate that a measured MN is unacceptable. For example, warning 222 may be output when calculated MN is below a predetermined threshold, when calculated MN is below an expected value by a predetermined amount or more, and/or when calculated MN deviates from one or more prior MNs by a predetermined amount, or more. Warning 222 may be in the form of an audio alert (e.g., an alarm), a visual alert, or a tactile alert (e.g., device vibration).

Display 226 may include information described above with respect to current MN display 220 and warning 222. Display 226 may be a display of a supervisory (e.g., remote) system that is in communication with controller 185 via one or more network devices 224. In some aspects, display 226 may belong to a device located at the same worksite as engine 135, and may monitor a plurality of engines 135 at this worksite by communicating with a respective plurality of controllers 185. Display 226 may, if desired, be located remotely, and may monitor engines 135 at multiple worksites or at a single worksite. Thus, a remote supervisory system may be configured to monitor a fleet of independently-operating engines and identify which engines 135 are experiencing or have experienced MN-related issues. In addition to identifying the engines 135 themselves, the remote supervisory system associated with display 226 may identify fueling issues due to correlations between the various engines 135. For example, issues with fuel received by a common supplier or from a particular location (e.g., in the example of field gas) may be identified and shown on display 226.

INDUSTRIAL APPLICABILITY

Methane number estimation system 100 may be installed with any internal combustion engine system in which it is desirable to determine combustion timing or methane number. Examples of suitable internal combustion engines include engines used for generating power in a stationary machine (e.g., a generator or other electricity-generating device), in a mobile machine (e.g., an earthmoving device, a hauling truck, a drilling machine, a vehicle, etc.), or in other applications in which it may be beneficial to operate an engine, including engines configured to use with different types of fuels or different fuel blends.

During operation of system 100, primary fuel may be supplied from primary fuel source 116. This fuel may be received from a supplier, may be field gas, may be a blend of two or more fuels from different sources, and may change over time. In some aspects, fuel from primary fuel source 116 may be blended actively with hydrogen gas, which tends to lower MN of the fuel mixture. This primary fuel may be supplied and combusted in engine 135, while sensors of sensor system 170 monitor various aspects of engine 135, such as in-cylinder pressure, intake manifold temperature, and humidity.

FIG. 3 includes a flowchart for an exemplary method 300 that may be performed during the operation of an internal combustion engine 135 of methane number estimation system 100. Method 300 may be useful for calculating MN and if desired, adjusting MN based on operating conditions associated with system 100.

During a step 302 of method 300, primary fuel may be supplied to cylinders 133 of engine 135 from primary fuel source 116. In some configurations, this primary fuel may be a gaseous fuel. The primary fuel may be the sole fuel provided to engine 135 and may be combusted via a spark plug (not shown). In some configurations, a pilot fuel such as diesel fuel may be supplied to engine 135.

The primary fuel supplied to engine 135 may, upon combustion, generate heat and increase the pressure of gas within cylinders 133. During a step 304, signals indicative of this combustion, including heat release signals, may be measured via sensor system 170. These signals may include heat release signal 200, such as a pressure signal generated with in-cylinder pressure sensor 130. Additional signals indicative of combustion may include load factor signal 205, humidity signal 206, and air temperature signal 208, as well as each of the above-described signals for calculating and/or adjusting methane number.

In a step 306, controller 185 may determine a combustion timing adjustment, such as combustion timing signal 204 generated with combustion adjustment module 202. This adjustment may be based on signals 200, for example, and may represent a deviation of heat release timing from an expected heat release timing. For example, a more advanced than expected heat release may indicate a lower MN while a more delayed heat release timing may indicate a higher MN. Step 306 may also take into account engine strategies, such as outputs generated based on MN engine control functions of module 216, that have an impact on heat release timing. These strategies may include changes to spark generation timing or changes to actuation of admission valve 124 or injector 114.

A step 308 may include estimating MN of the primary fuel based on the signals received in step 304 and the determined injection timing adjustment or spark timing adjustment. This estimation may be performed with MN adjustment module 216, as described above. If desired, step 308 may include adjusting the calculated MN, based on humidity signal 206 and/or air temperature signal 208. Load factor signal 205 may be used in the initial MN estimation and/or to adjust this initial estimation.

Step 308 may include evaluating a current (e.g., real-time or near real-time) MN value, as well as storing historical MN values and comparing the current MN value to one or more prior MN values. Step 308 may include performing one or more of the above-described MN monitoring functions and MN diagnostic functions associated with module 216. For example, MN adjustment module 216 may evaluate trends and correlate changes in MN to other inputs received with controller 185 (e.g., source of fuel input by a user).

A step 310 may include outputting the calculated MN by generating a notification based on the MN estimated in step 308. Step 310 may include presenting a current (i.e., real-time or recent) MN value, one or more past MNs, a MN trendline (e.g., in the form of a chart), or a qualitative representation of MN. As described above, notifications may be qualitative, such as color-coded displays, audible warnings, physical (e.g., tactile) warnings, or others. Step 310 may further include generating an output for controlling aspects of engine 135, such as spark timing or fuel injection timing, to improve the performance of engine 135.

The method and system described herein may facilitate methane number calculation in a dynamic or automated manner. For example, the method and system may calculate a methane number value, and refresh the calculated value over time, capturing changes that occur due to refueling or fuel blending, including active hydrogen blending. Further, methane number estimation can be made without requiring specific knowledge of the constituents of the fuel. Methane number may be estimated accurately based on measurements that indicate heat release. Methane number can also be adjusted based on changing conditions, such as humidity and intake air temperature. Additionally, regular (e.g., dynamic) methane number estimation may allow higher-level analysis, including trend identification for one engine, or analysis for a fleet of engines.

It will be apparent to those skilled in the art that various modifications and variations can be made to the disclosed system and method without departing from the scope of the disclosure. Other embodiments of the system and method will be apparent to those skilled in the art from consideration of the specification and system and method disclosed herein. It is intended that the specification and examples be considered as exemplary only, with a true scope of the disclosure being indicated by the following claims and their equivalents.

What is claimed is:

1. A method for estimating methane number of fuel, the method comprising:
   receiving and combusting fuel with an internal combustion engine;
   receiving a signal indicative of heat release of fuel combusted with an internal combustion engine;
   determining a combustion timing of the fuel based on the signal; and
   estimating the methane number of fuel based on the combustion timing.

2. The method of claim 1, further including causing a display to present a current methane number.

3. The method of claim 1, further including causing a display to show a plurality of methane numbers at different times.

4. The method of claim 1, further including outputting the methane number to a supervisory system that monitors methane numbers for a plurality of internal combustion engines.

5. The method of claim 1, wherein the fuel is a gaseous fuel.

6. The method of claim 5, wherein the combustion timing corresponds to a spark timing or a fuel injection timing.

7. The method of claim 6, further including adjusting the methane number based on a sensed humidity, an estimated humidity, an air temperature, or a load of the internal combustion engine.

* * * * *